March 6, 1951 H. E. HIPPS ET AL 2,543,780
BONE GRAFT APPARATUS
Filed Dec. 9, 1946 3 Sheets-Sheet 2

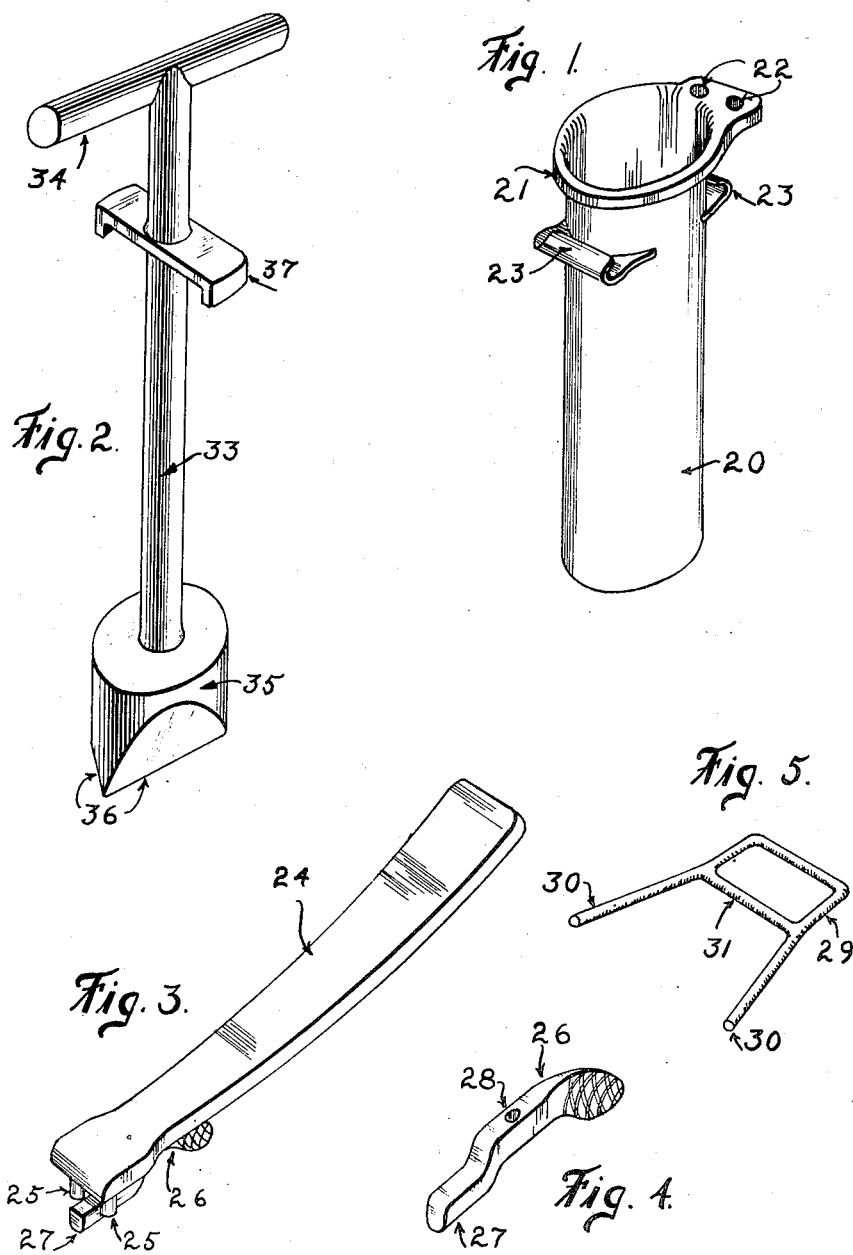

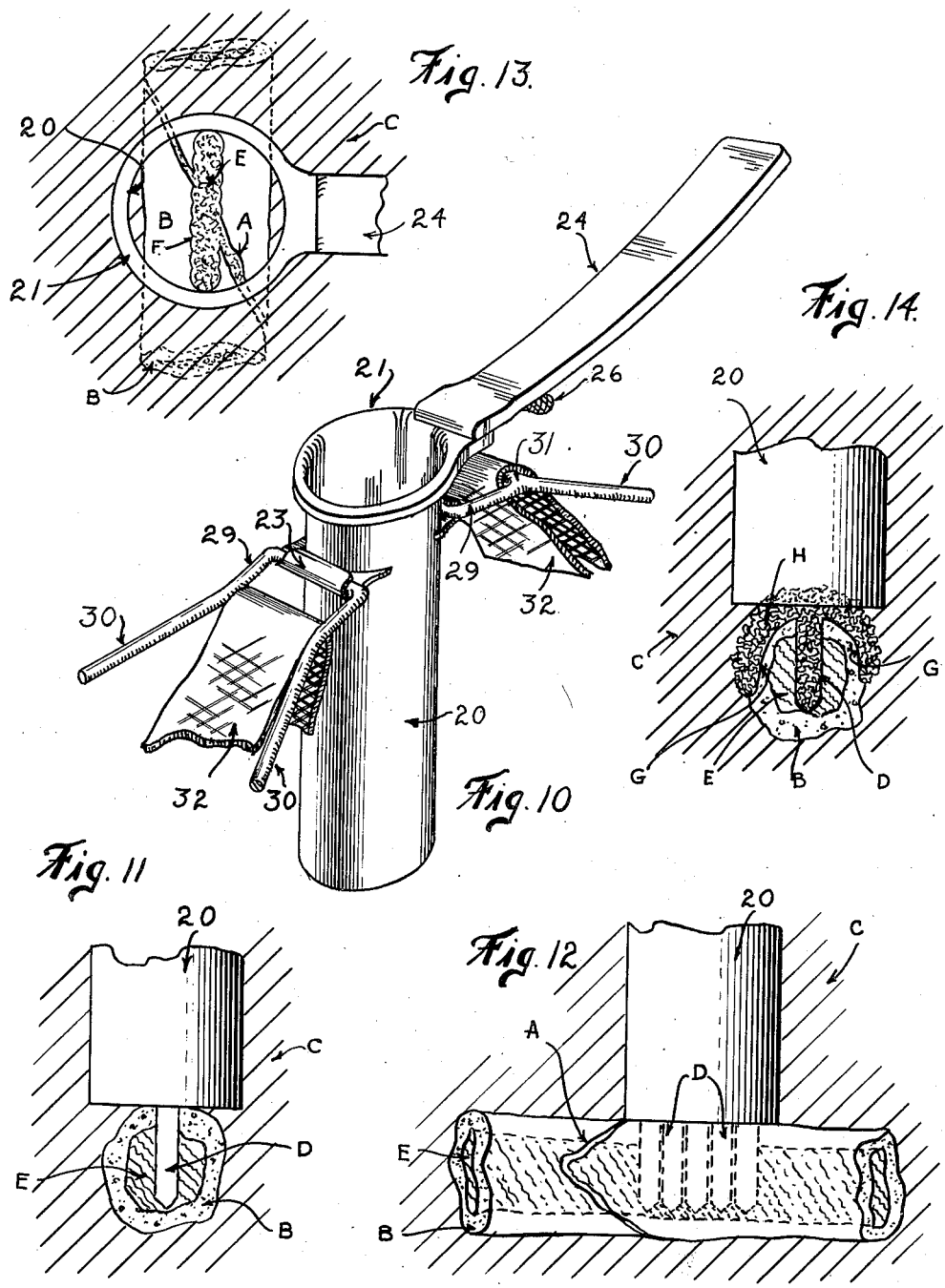

INVENTORS
HERBERT E. HIPPS
EUGENE J. KUPJACK
BY
M. O. Hayes
ATTORNEY

Patented Mar. 6, 1951

2,543,780

UNITED STATES PATENT OFFICE 2,543,780

BONE GRAFT APPARATUS

Herbert E. Hipps, Waco, Tex., and Eugene J. Kupjack, Park Ridge, Ill.

Application December 9, 1946, Serial No. 715,121

3 Claims. (Cl. 128—83)

(Granted under the act of March 3, 1883, as amended April 30, 1928; 370 O. G. 757)

This invention relates to apparatus for preparing a non-union site of certain long bones for bone grafting and for applying finely divided bone chips or meal to promote a union, and it is more particularly described as a sub-cutaneous apparatus for this purpose.

In many non-union breaks of the femur, humerous, and tibia, where the bone is in good position, it is possible, with the present invention, to freshen the bone ends, to clean out the medullary canals adjacent the break, to freshen a large surface area of the bone, and to apply thereto a bone graft in the form of finely divided bone chip or bone meal.

The present invention relates particularly to the provision of improved means for a sub-cutaneous application of various instruments and bone meal through a common site shell insertable through an incision which need not be more than about two or two and one-quarter inches long.

An important object of the invention is to provide a site shell used in common by various instruments in preparing the fractured bone parts, and in applying bone meal thereto to produce a bone graft.

A further object of the invention is to reduce the time required for a bone graft operation by performing an osteotomy and the bone graft through one incision by progressive actions, without wide cutting or splitting of the muscle fibres, and without wide separation of the periosteum from the bone and the resultant loss of blood supply to the bone caused by a big incision.

Other objects of the invention will appear in the specifications and will be apparent from the accompanying drawings, in which:

Fig. 1 is a perspective view of a site shell adapted to be inserted through an incision in the flesh to the bone;

Fig. 2 is a perspective of an osteotome guide insertable through the shell of Fig. 1;

Fig. 3 is a perspective view of a removable handle for the shell of Fig. 1;

Fig. 4 is a perspective view of a clamp pivotally attached to the handle;

Fig. 5 is a perspective view of a belt clamp for the site shell;

Fig. 10 is a perspective view of the site shell of Fig. 1 with the handle and belt clamps assembled thereon;

Fig. 11 is a sectional view of a bone with a site shell applied thereto through surrounding flesh;

Fig. 12 is a side view of a portion of a bone with a shell applied laterally to the site of a fracture;

Fig. 13 is an end view of the shell as applied in Fig. 12, showing the bone fracture with a scalloped slot ready to receive the bone meal; and Fig. 14 is a sectional view similar to Fig. 11, showing the bone meal as applied for a bone graft.

Figure 6:
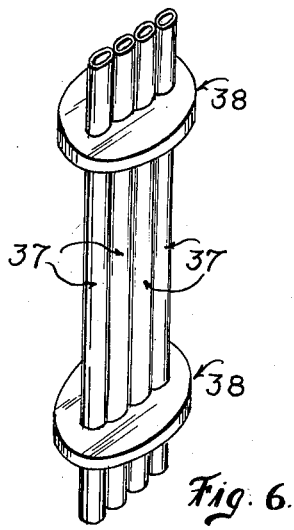
Fig. 6 is a perspective view of a four tube drill guide insertable in the site shell.

With the present invention, it is possible to cause a fixation of a broken bone, that is, to apply a cast or to apply a four-pin fixation device (of Stader or Roger-Anderson) one day, and then a day or so later, to do the bone graft, instead of combining both procedures at one time, as is necessary where an open operation is performed on the bone. This lessens the shock and trauma incidental to this operation.

In all cases the bone must first be held securely in an end to end position by some device, such as a cast or a four-pin fixation device. When the broken bone is maintained in an exact end to end position, the present invention may be utilized. It cannot be used where a bone has malposition or mal-union. Its greatest usefulness is in non-unions of the femur, and in non-unions of the tibia, but since this is of frequent occurrence, the invention has a wide range of use.

Referring now more particularly to the drawings a bone site shell 20 is of uniform internal and external diameters and of slightly more than sufficient length to extend through the fleshy part of the thigh into contact with the femur. At one end is a flange 21 with a handle extension at one side having perforations 22 therethrough. Near this end at the outside are attached oppositely extending hooks 23.

A detachable handle 24 has projections 25 from one side near the end to engage in the shell flange perforations 22. A handle catch 26 has an offset end 27 and a pivot hole 28 intermediate its ends by which it is pivoted to the handle near the projections 25. When the projections are seated in the perforations, the offset may be moved to engage the under side of the flange binding the handle to the shell. By turning the catch the handle may be released and disengaged from the flange.

Engageable with each of the hooks 23 is a shell clamp 29 (Figs. 5 and 10) having flaring side bars 30 and a connecting cross bar 31 at a distance from the ends of the side bars for attaching a strap 32 which may extend around a limb or thigh for holding the shell 20 in place.

An osteotome guide as shown in Fig. 2 has a shank 33 with a crosspiece handle 34 at one end and a head 35 at the other end to fit slidably in the shell 20. The head has opposite beveled sides 36 which together provide a pointed guide, not necessarily sharp, which may be used to part muscle fibres, when inserted in and projecting from the shell. Near the handle end of the shank is a fixed cross piece 37 adapted to engage the flanged end of the shell 20 when the head 25 is inserted through the shell and limiting the distance the pointed end projects from the shell.

Figure 7:
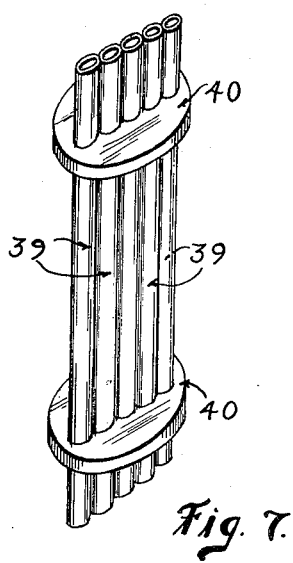
Fig. 7 is a perspective view of a five tube drill guide insertable in the site shell.

Also insertable in the shell 20 is a bone drill guide shown in Fig. 6 having four drill guide tubes 37 held and spaced by circular plates 38, and a five tube guide shown in Fig. 7 having guide tubes 39 held and spaced by circular plates 40. A bone drill 41 has a long shank 42 adapting it to be inserted through the guide tubes 37 and 39 and operated from the top. The centers of the four tubes 37 are between the centers of the five tubes 39 when one drill guide is replaced by the other in the shell 20 the drill operated in the tubes will produce a continuous slot with scalloped edges when the drill is operated in all of the guide tubes.

Figure 9:
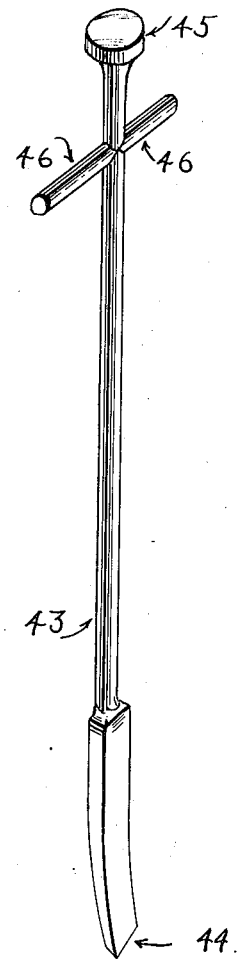
Fig. 9 is a perspective view of an osteotome to fit loosely in the site shell.

After the drill guide tubes are removed from the shell 20, an osteotome 43 as shown in Fig. 9 may be inserted for roughening the cortex and otherwise preparing the site for receiving bone meal. The osteotome has a chisel 44 at its lower end, a long shank to extend through the shell, a knob 45 at the upper end and a cross piece 46 adjacent the end to provide a handhold for manipulating the chisel through the shell.

This apparatus is not used where heavy onlay grafts are to be made; this type have not proven as satisfactory as the chip or bone meal grafts of the present invention. Before the present apparatus can be sited any mal-position or mal-union must be corrected. After a good end to end position is obtained, a plaster cast or the four-pin fixation apparatus (of Stader, or Roger-Anderson) may be used to held the bone in such position and with proper alignment.

For an application of this invention to femur break A in a bone B, for example, any suitable method may be used for determining the exact positions of the bone ends and to locate the incision so that the middle of the incision may be made exactly over the middle of the break. If a cast has been applied it is necessary to cut a window over the proposed operation site. With the four-pin fixation devices no preliminary preparation is necessary.

When the bone is thus set or fixed, and the incision location is determined, the bone graft may be made at once, the next day, or later, as desired. Preceding the bone graft the skin is thoroughly cleaned and prepared in the usual way.

An incision about two and one quarter inches long is made in the skin C at the lateral side of the break, which is extended through the deep fascia.

The osteotome guide (Fig. 2) is inserted into the shell 20 with the pointed head 35 projecting at the bottom. This assembly is inserted into the incision and by a process of splitting the muscle fibres with the pointed edge of the guide head, the shell may also be pressed inwardly at the side of the break, as represented in Figs. 11 and 12, fitting tightly therein to reduce bleeding.

When the exactly desired location directly over the center of the break is obtained by fluoroscopic or X-ray control, the osteotome guide is removed and the shell is forced into contact with the bone. The demountable handle 24 is used to direct the placement of the shell and is then removed.

With the shell firmly seated, two shell clamps 29 are engaged with shell hooks 23 and a belt 32 is tightened around the limb. For some insertions of the shell the flaring ends of the side bars 30 of the shell clamps may be engaged with the outer skin by towel clamp (not shown) in a well known manner, for securing the shell in place.

Fibrous tissue and the periosteum may be removed from the surface of the bone through the shell by means of a long knife and a long pair of forceps, by direct vision, using a head light mirror reflector to direct light into the shell.

Figure 8:
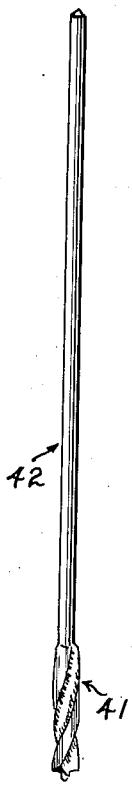
Fig. 8 is a perspective view of a bone drill insertable through the guide tubes.

With the shell firmly secured and the break site thus prepared, the four tube drill guide assembly of Fig. 6 is inserted into the shell 20 and inserting a long drill (Fig. 8) into the tubes 37, holes D are drilled through the cortex and into the intra-medullary space E. After the four holes are drilled, this guide is taken out of the shell and the five tube drill guide assembly of Fig. 7 is inserted. Superimposed drilling through this latter assembly produces a scalloped slot F (Fig. 13) extending longitudinally of the bone B, half on each side of the break.

After the second drill guide is removed an osteotome 43 (Fig. 9) is inserted for cleaning out the slot F, cutting and removing all the intramedullary selerosis and fibrosis. To denude the cortex to a state of raw bleeding it may be roughened with a chisel and hammer or with the osteotome 43. The shell 20 may be tilted without withdrawal, to provide an outer roughened or reduced surface G extending a considerable distance around the bone.

Bone meal or finely divided bone chips H are now inserted through the shell 20, applied through the slot F to the intra-medullary space produced by the drill, and packed on the denuded surface G and between the separated ends of the bone breaks, preferably in projecting and overlapping relation.

When the bone particles have been firmly packed the shell is disengaged from its fastening means and withdrawn, and two stitches through the skin and deep fascia will close the wound. The entire operation can be completed in from thirty to forty five minutes. There is no broad incision through the skin, no wide cutting of the muscles or splitting of the muscle fibres, and consequently the shock and loss of blood is very slight.

In a tibia operation, the procedure is the same as for the femur with the exception that usually the fibula is also broken. In this case the incision for the tibia is made a little anteriorly to the frontal or usual position, so that the bone graft on the fibula and tibia can be made through the same incision. The graft on the tibia is made where it has the most blood supply; that is, where the muscles lie against the bone and not where the skin lies directly over the bone where the peripheral blood supply is poor.

This apparatus is thus applicable to a variety of uses for this type of breaks, and has the advantages accruing to a short incision and a rapid operation, such as slight shock, small loss of blood, and a rapid recovery.

Although the apparatus is thus particularly described it should be regarded by way of illustration and not as a limitation of the invention, as many changes in the construction, combination and arrangement of the parts may be made without departing from the spirit and scope of the invention as defined by the claims.

This invention may be manufactured and used by or for the Government of the United States of America for governmental purposes without the payment of any royalties thereon or therefor.

We claim:

1. Bone graft apparatus comprising a hollow shell with one end plain insertable through a cutaneous incision to a bone break site, means insertable through the shell for operating on and removing portions of the bone, and fastening means including hooks at opposite sides near the other end of the shell, and a shell clamp attachable to each hook having a cross bar pivoted in one of the hooks, outwardly flaring side bars for surface skin engagement, a connecting cross bar spaced from the first cross bar, and an attachment strap extending around the connecting cross bars for holding the plain end against the bone.

2. Bone graft apparatus comprising a hollow shell with an unobstructed open end insertable through a cutaneous incision to a bone break site, means insertable through the shell for operating on and removing portions of the bone, fastening means attachable at opposite sides near the outer end of the shell for holding it in place against a bone, and a detachable handle engageable with the outer end of the shell to assist in holding and guiding it to a bone break site, the shell having a flange with perforations and the handle contacting the top of the flange and having projections on the under side to engage the perforations, and a catch pivoted to the under side of the handle and engaging the under side of the flange to retain the projections in the perforations.

3. Bone graft apparatus comprising a hollow shell insertable at one end through a cutaneous incision to a bone site, fastening means engaging the other end of the shell for holding it against the bone site and projecting outwardly therefrom, tool guiding means insertable from the outer end of the shell comprising a plurality of tubes, each substantially as long as the shell, and means holding the tubes in a predetermined transverse path at the bone site, a tool being insertable and manipulated from the outer ends of the tubes.

HERBERT E. HIPPS.
EUGENE J. KUPJACK.

REFERENCES CITED

The following references are of record in the file of this patent:

UNITED STATES PATENTS

| Number | Name | Date |
| --- | --- | --- |
| 953,922 | Rogers | Apr. 5, 1910 |
| 1,242,314 | Bean | Oct. 9, 1917 |

FOREIGN PATENTS

| Number | Country | Date |
| --- | --- | --- |
| 13,856 | Norway | June 8, 1904 |
| 742,618 | France | Jan. 4, 1933 |

OTHER REFERENCES

Article in Surgery, Gynecology and Obstetrics, by Stanley M. Leydig, page 715, yr. 1939. (Copy in Patent Office Library.)